(12) United States Patent
Bertz et al.

(10) Patent No.: US 9,210,621 B1
(45) Date of Patent: Dec. 8, 2015

(54) METHOD AND SYSTEM FOR FACILITATING SERVICE LEVEL CONTINUITY

(71) Applicant: Sprint Spectrum L.P., Overland Park, KS (US)

(72) Inventors: Lyle T. Bertz, Lee's Summit, MO (US); C. Brent Hirschman, Overland Park, KS (US); Trevor D. Shipley, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 212 days.

(21) Appl. No.: 14/033,951

(22) Filed: Sep. 23, 2013

(51) Int. Cl.
*H04W 36/00* (2009.01)

(52) U.S. Cl.
CPC .................................. *H04W 36/0022* (2013.01)

(58) Field of Classification Search
CPC .......... H04W 28/24; H04W 8/18; H04W 8/20; H04W 36/0044
See application file for complete search history.

(56) References Cited

U.S. PATENT DOCUMENTS

| | | | |
|---|---|---|---|
| 5,189,395 A | 2/1993 | Mitchell | |
| 5,276,440 A | 1/1994 | Jolissaint et al. | |
| 5,457,680 A | 10/1995 | Kamm et al. | |
| 5,649,301 A | 7/1997 | Yabusaki et al. | |
| 5,673,305 A | 9/1997 | Ross | |
| 5,731,757 A | 3/1998 | Layson, Jr. | |
| 5,732,347 A | 3/1998 | Bartle et al. | |
| 5,845,142 A | 12/1998 | Hayasaka | |
| 5,919,239 A | 7/1999 | Fraker et al. | |
| 6,014,080 A | 1/2000 | Layson, Jr. | |
| 6,219,540 B1 | 4/2001 | Besharat et al. | |
| 6,330,438 B1 | 12/2001 | McClelland et al. | |
| 6,349,206 B1 | 2/2002 | Reichelt et al. | |
| 6,427,001 B1 | 7/2002 | Contractor et al. | |
| 6,484,027 B1 | 11/2002 | Mauney et al. | |
| 6,493,629 B1 | 12/2002 | Van Bosch | |
| 6,545,448 B1 | 4/2003 | Stanley et al. | |
| 6,570,974 B1 | 5/2003 | Gerszberg et al. | |
| 6,606,556 B2 | 8/2003 | Curatolo et al. | |
| 6,639,516 B1 | 10/2003 | Copley | |
| 6,650,901 B1 | 11/2003 | Schuster et al. | |
| 6,665,611 B1 | 12/2003 | Oran et al. | |
| 6,674,368 B2 | 1/2004 | Hawkins et al. | |
| 6,678,357 B2 | 1/2004 | Stumer et al. | |

(Continued)

OTHER PUBLICATIONS

Office action from U.S. Appl. No. 13/427,357, dated Oct. 23, 2014.

(Continued)

*Primary Examiner* — Albert T Chou

(57) ABSTRACT

A method and corresponding system to help maintain continuity of service level for a client device, such as where the client device is being served by an access network in accordance with a set of policy rules and the client device is going to stop being served by that access network and may then be served by another network. To help provide service continuity, the serving access network may detect that the client device is going to stop being served by the access network, and, responsively but before the client device stops being served by the access network, the access network or another entity may provision the client device with one or more service policy rules that the client device itself may then apply when the client device is no longer being served by the access network, such as when the client device is being served by another network instead.

17 Claims, 6 Drawing Sheets

(56) References Cited

U.S. PATENT DOCUMENTS

| | | | |
|---|---|---|---|
| 6,718,263 B1 | 4/2004 | Glass et al. | |
| 6,735,455 B2 | 5/2004 | Naito et al. | |
| 6,744,859 B1 | 6/2004 | Koepke et al. | |
| 6,771,742 B2 | 8/2004 | McCalmont et al. | |
| 6,856,804 B1 | 2/2005 | Ciotta | |
| 6,884,816 B2 | 4/2005 | May et al. | |
| 6,898,438 B1 | 5/2005 | Uchida | |
| 6,906,522 B2 | 6/2005 | Bertness et al. | |
| 7,020,460 B1 | 3/2006 | Sherman et al. | |
| 7,024,321 B1 | 4/2006 | Deninger et al. | |
| 7,042,985 B1 | 5/2006 | Wright | |
| 7,046,992 B2 | 5/2006 | Wallentin et al. | |
| 7,098,855 B2 | 8/2006 | Kotzin et al. | |
| 7,155,238 B2 | 12/2006 | Katz | |
| 7,164,930 B2 | 1/2007 | Korneluk et al. | |
| 7,245,900 B1 | 7/2007 | Lamb et al. | |
| 7,409,219 B2 | 8/2008 | Levitan | |
| 7,433,673 B1 | 10/2008 | Everson et al. | |
| 7,602,886 B1 | 10/2009 | Beech et al. | |
| 7,904,244 B2 | 3/2011 | Sugla | |
| 8,385,216 B1 | 2/2013 | Shetty et al. | |
| 2001/0026240 A1 | 10/2001 | Neher | |
| 2002/0080759 A1 | 6/2002 | Harrington et al. | |
| 2002/0187779 A1 | 12/2002 | Freeny, Jr. | |
| 2002/0196147 A1 | 12/2002 | Lau | |
| 2003/0036374 A1 | 2/2003 | English et al. | |
| 2003/0109245 A1 | 6/2003 | McCalmont et al. | |
| 2003/0134648 A1 | 7/2003 | Reed et al. | |
| 2003/0148757 A1 | 8/2003 | Meer | |
| 2003/0162548 A1 | 8/2003 | Kujala | |
| 2003/0210671 A1 | 11/2003 | Eglin | |
| 2003/0216144 A1 | 11/2003 | Roese et al. | |
| 2004/0012519 A1 | 1/2004 | Durst et al. | |
| 2004/0057425 A1 | 3/2004 | Brouwer et al. | |
| 2004/0176040 A1 | 9/2004 | Thornton et al. | |
| 2004/0184584 A1 | 9/2004 | McCalmont et al. | |
| 2004/0190497 A1 | 9/2004 | Knox | |
| 2004/0192271 A1 | 9/2004 | Eisner et al. | |
| 2004/0196182 A1 | 10/2004 | Unnold | |
| 2004/0198397 A1 | 10/2004 | Weiss | |
| 2004/0220726 A1 | 11/2004 | Jin et al. | |
| 2004/0225534 A1* | 11/2004 | Zheng | 705/4 |
| 2005/0009521 A1 | 1/2005 | Preece | |
| 2005/0020241 A1 | 1/2005 | Holland et al. | |
| 2005/0020242 A1 | 1/2005 | Holland et al. | |
| 2005/0020280 A1 | 1/2005 | Holland et al. | |
| 2005/0020281 A1 | 1/2005 | Holland et al. | |
| 2005/0024269 A1 | 2/2005 | Kotzin et al. | |
| 2005/0026589 A1 | 2/2005 | Holland et al. | |
| 2005/0083911 A1 | 4/2005 | Grabelsky et al. | |
| 2005/0096102 A1 | 5/2005 | Mock et al. | |
| 2005/0111630 A1 | 5/2005 | Potorny et al. | |
| 2005/0174991 A1 | 8/2005 | Keagy | |
| 2005/0175166 A1 | 8/2005 | Welenson et al. | |
| 2005/0213716 A1 | 9/2005 | Zhu et al. | |
| 2006/0023747 A1 | 2/2006 | Koren et al. | |
| 2006/0030290 A1 | 2/2006 | Rudolf et al. | |
| 2006/0072547 A1 | 4/2006 | Florkey et al. | |
| 2006/0084430 A1 | 4/2006 | Ng | |
| 2006/0120517 A1 | 6/2006 | Moon et al. | |
| 2006/0188073 A1 | 8/2006 | Wright | |
| 2006/0193446 A1 | 8/2006 | Colunga | |
| 2006/0281437 A1 | 12/2006 | Cook | |
| 2007/0003024 A1 | 1/2007 | Olivier et al. | |
| 2008/0001771 A1 | 1/2008 | Faoro et al. | |
| 2008/0108330 A1 | 5/2008 | O'Neil et al. | |
| 2010/0135243 A1* | 6/2010 | Larsson et al. | 370/331 |
| 2010/0169950 A1* | 7/2010 | Matti et al. | 726/1 |
| 2010/0246780 A1 | 9/2010 | Bakker et al. | |
| 2011/0044198 A1 | 2/2011 | Persson et al. | |
| 2012/0100849 A1* | 4/2012 | Marsico | 455/432.1 |
| 2012/0108343 A1* | 5/2012 | Marsico | 463/42 |
| 2012/0142305 A1 | 6/2012 | Lane et al. | |
| 2013/0028145 A1 | 1/2013 | Arora | |
| 2013/0095826 A1* | 4/2013 | Vrbaski et al. | 455/432.3 |
| 2015/0081903 A1* | 3/2015 | Molinero Fernandez et al. | 709/225 |

OTHER PUBLICATIONS

Office action from U.S. Appl. No. 13/427,357, dated May 21, 2015.
U.S. Appl. No. 13/427,357, filed Mar. 22, 2012.
Office action from U.S. Appl. No. 13/427,357, dated Mar. 19, 2014.
D. Ma and M. Ma, "A QoS-Based Vertical Handoff Scheme for Interworking of WLAN and WiMAX," IEEE GLOBECOM 2000 proceedings, 2009.
M. Patrick, "DHCP Relay Agent Information Option," Network Working Group, Request for Comments: 3046, Jan. 2001.
H. Schulzrinne, Dynamic Host Configuration Protocol (DHCP-for-IPv4) Option for Session Initiation Protocol (SIP) Servers, Network Working Group, Request for Comments: 3361, Aug. 2002.
H. Schulzrinne and B. Volz, Dynamic Host Configuration Protocol (DHCPv6) Options for Session Initiation Protocol (SIP) Servers, Networking Group, Request for Comments; 3319, Jul. 2003.
H. Schulzrinne, "Emergency Services URI for the Session Initiation Protocol," Network Working Group, Internet-Draft, Feb. 8, 2004.
J. Polk, et al., "Dynamic Host Configuration Protocol Option for Coordinate-based Location Configuration Information," Network Working Group, Request for Comments: 3825, Jul. 2004.
H. Schulzrinnet and B. Rosen, "Emergency Services for Internet Telephony Systems," Network Working Group, Internet-Draft, Oct. 18, 2004.
H. Schulzrinnet and R. Marshall, "Requirements for Emergency Context Resolution with Internet Technologies," ECRIT Requirements, Internet-Draft, May 5, 2005.
Schulzrinne, "Emergency Call Services for SIP-baed Internet Telephony," Internet Engineering Task Force, Internet Draft, Mar. 25, 2001.
Schulzrinne, "Providing Emergency Call Services for SIP-based Internet Telephony," Internet Engineering Task Force, Internet Draft, Jul. 13, 2000.
Avaya Inc., "Comments on IP Telephony Support for Emergency Calling Service," TIA TR41.4, TR41.4.1/01-02-002, Jul. 25, 2001.
Nortel Networks, "IP Telephony Support for Emergency Calling Service," TIA TR-41, TR41.4.1/01-08-001, Aug. 22, 2001.
Intrado, Inc., "VoIP Emergency Calling Services," 2003.
E. Griffith, "Wi-Fi Powers Metro Positioning System," Wi-Fi Planet News, Jun. 20, 2005.
Cisco Systems, Inc., "Cisco Emergency Responder Version 1.2(2)," Data Sheet, Sep. 2004.
D. Jackson, "Nortel proposes VoIP 911 solution," Mobile Radio Technology, May 1, 2004.
"How VOIP E911 might work," Vonage™ VoIP Forum—Vonage News, Reviews and Discussion, Mar. 2005.
G. Petrey, "NG 911 Project," Texas A&M University, Internet2 Technology Evaluation Center, Mar. 29, 2005.
B. Templeton, "DHCP Option for street address, PSAP for VoIP E911," Brad Ideas, May 2, 2005.
Proxim Corporation, "Wi-Fi in the Interprise: Applications, Environments, Requirements and Solutions," Position Paper, 2004 (no month listed).
M. Tariq, et al., "Mobility Aware Server Selection for Mobile Streaming Multimedia Content Distribution Networks," Proc. 8th Int. workshop on Web Content Caching and Distribution, 2003 (no month listed).
J. Pulver, "pulver.com comments on the FCC issued E911 report," Nov. 4, 2002.
J. Pulver, "pulver.com comments on the Hatfield E911 Report," Oct. 30, 2002.
Intel Corporation, "Virtual LANs, Flexible network segmentation for high-speed LANs," Intel Network Information Series, 1997 (no month listed).
D. Passmore and J. Freeman, "The Virtual LAN Technology Report," decisys, May 1996.

* cited by examiner

METHOD AND SYSTEM FOR FACILITATING SERVICE LEVEL CONTINUITY

BACKGROUND

Unless otherwise indicated herein, the materials described in this section are not prior art to the claims and are not admitted to be prior art by inclusion in this section.

In general, a telecommunication system may define an access network configured to provide client devices with connectivity to one or more transport networks such as the public switched telephone network (PSTN) or the Internet. Such an access network may include a policy decision point (PDP) that manages service policy rules defining service levels for served client devices, and a policy enforcement point (PEP) that enforces those service policy rules. In a typical implementation, for instance, each client device may subscribe to service of the access network and may have an associated service account or service profile defining a set of service policy rules, and the PDP may maintain or have access to each client device's set of service policy rules. When a client device registers with the access network, the PDP may then provide an indication of that client device's service policy rules to the PEP, so that the PEP can enforce the client device's service policy rules as the access network serves the client device.

Service policy rules for a given client device may define a quality of service to be provided to the client device, such as a data rate (e.g., guaranteed bit rate, maximum bit rate, or best effort service quality) and/or communication quality (e.g., voice and/or data encoding quality), as well as other restrictions (e.g., access control rules or content filtering rules) and/or allowances (e.g., entitlement to engage in certain services) regarding service level for the client device, in addition to policies regarding configuration of the access network when serving the client device. In practice, various client devices may have different service policy rules, possibly based on subscription level, device type, and/or other factors for instance.

OVERVIEW

Disclosed herein is a method and corresponding system to help maintain continuity of service level for a client device. The method is particularly useful in a scenario where the client device is being served by an access network in accordance with a set of policy rules, and the client device is going to stop being served by that access network and may then be served by another network. For instance, this may occur when the client device is going to de-register from the access network and hand off to be served by another network, or when the client device is going to de-register from the access network and may then later be served by another network. In such a scenario, it may be desirable from a user-perspective for the client device to have substantially the same service level when not served by the access network (e.g., when served by the other network) as the client device had when served by the access network.

As a specific example of this, consider a scenario where a client device is served by a wireless wide area network (WWAN) (e.g., a cellular wireless network) that maintains and applies a set of service policy rules for the client device, but where the client device is going to stop being served by the WWAN and will then instead be served by a wireless local area network (WLAN) (e.g., a WiFi based network). This transition might be triggered by the client device itself, such as where the device detects threshold low signal strength from the WWAN but detects sufficient signal strength from the WLAN. Alternatively, the transition might be triggered by the WWAN, such as where the WWAN experiences threshold congestion or has other reason to discontinue serving the client device and responsively directs the client device to hand off to a local WLAN for continued service. Further, the transition may involve the client device leaving service of the WWAN and then at some later time finding service of the WLAN and starting to be served by the WLAN.

In this example scenario, it may be beneficial for the client device to experience largely the same service level when served by the WLAN as the client device experienced when served by the WWAN. For instance, if the client device was receiving a certain quality of service (e.g., a particular data rate) of communication served by the WWAN, it may be beneficial for the client device to receive largely that same quality of service of communication served by the WLAN. As another example, if the WWAN was configured to apply particular access control rules or content filtering rules for communications from the client device, it may be beneficial for the client device to face the same access control rules or content filtering rules when served by the WLAN.

To facilitate this, the disclosed method and corresponding system involves an access network detecting that a client device being served by the access network is going to stop being served by the access network, and, responsively but before the client device stops being served by the access network, the access network or another entity provisioning the client device with one or more service policy rules that the client device itself may then apply when the client device is no longer being served by the access network.

In the example scenario described above, for instance, the WWAN may detect that the client device is going to stop being served by the WWAN and, before the client device leaves service of the WWAN may then responsively provision the client device with a subset of the service policy rules that the WWAN maintains and applies for the client device. That way, when the client device transitions to be served by the WLAN instead, the client device itself may enforce that subset of service policy rules and/or may pass the rules along to another serving network to apply, optimally helping to provide the client device with a service level consistent with what the client device experienced when served by the WWAN.

In practice, the service policy rules that the access network (e.g., WWAN) is configured to apply for the client device may include one or more service policy rules that are specific to the access network (such as rules pertaining to internal connections in the access network or otherwise to configuration or operation of the access network in particular) and one or more service policy rules that are not specific to the access network (such as access control rules and content filtering rules that pertain to broader communication by the client device rather than to specific operation of the access network). In that case, the subset of the service policy rules that the access network or other entity provisions the client device with may be just the one or more service policy rules that are not specific to the access network.

Furthermore, if at some point after the client device stops being served by the access network, the client device returns to be served by the access network, the access network may then receive from the client device at least one of the service policy rules that the access network or other entity provisioned the client device with, and the access network may then serve the client device based on that service policy rule. For instance, the access network may compare that received service policy rule with a service policy rule that the access network currently maintains for the client device and may select one of those service policy rules to apply based on versions, scope, and/or other factors. In that way, the access network may then further help to facilitate continuity of service level for the client device.

Accordingly, in one respect, disclosed is a method operable where a wireless client device is being served by a wireless access network. The method may involve the wireless access network detecting that the wireless client device is going to stop being served by the wireless access network. Further, the method then involves, in response to detecting that, but before the wireless client device stops being served by the wireless access network, provisioning the wireless client device with one or more service policy rules for application by the wireless client device when the wireless client is no longer being served by the wireless access network.

In another respect, disclosed is a method in which an access network serves a client device with telecommunication service and maintains and applies for the client device a set of service policy rules defining a service level for the client device. In accordance with the method, the access network detects that the client device is going to stop being served by the access network, and responsive to detecting that, the access network or another entity then provisions the client device with a subset of the service policy rules for application by the client device when the client device is no longer being served by the access network.

And in still another respect, disclosed is an access network that includes one or more wireless base stations, a gateway that is configured to serve a wireless client device with telecommunication service in accordance with a set of service policy rules defining a service level for the wireless client device, a processing unit, data storage, and program instructions stored in the data storage an executable by the processing unit to carry out various functions. In practice, for instance, the functions may include detecting, when the client device is being served by the access network, that the client device is going to stop being served by the access network. Further, the functions may include, responsive to detecting that the client device is going to stop being served by the access network, provisioning the client device with a subset of the service policy rules, for application by the client device when the client device is no longer being served by the access network.

These as well as other aspects, advantages, and alternatives will become apparent to those of ordinary skill in the art by reading the following detailed description, with reference where appropriate to the accompanying drawings. Further, it should be understood that the description provided by this document, including this overview section, is provided merely by way of example and without limitation.

DETAILED DESCRIPTION

Figure 1:
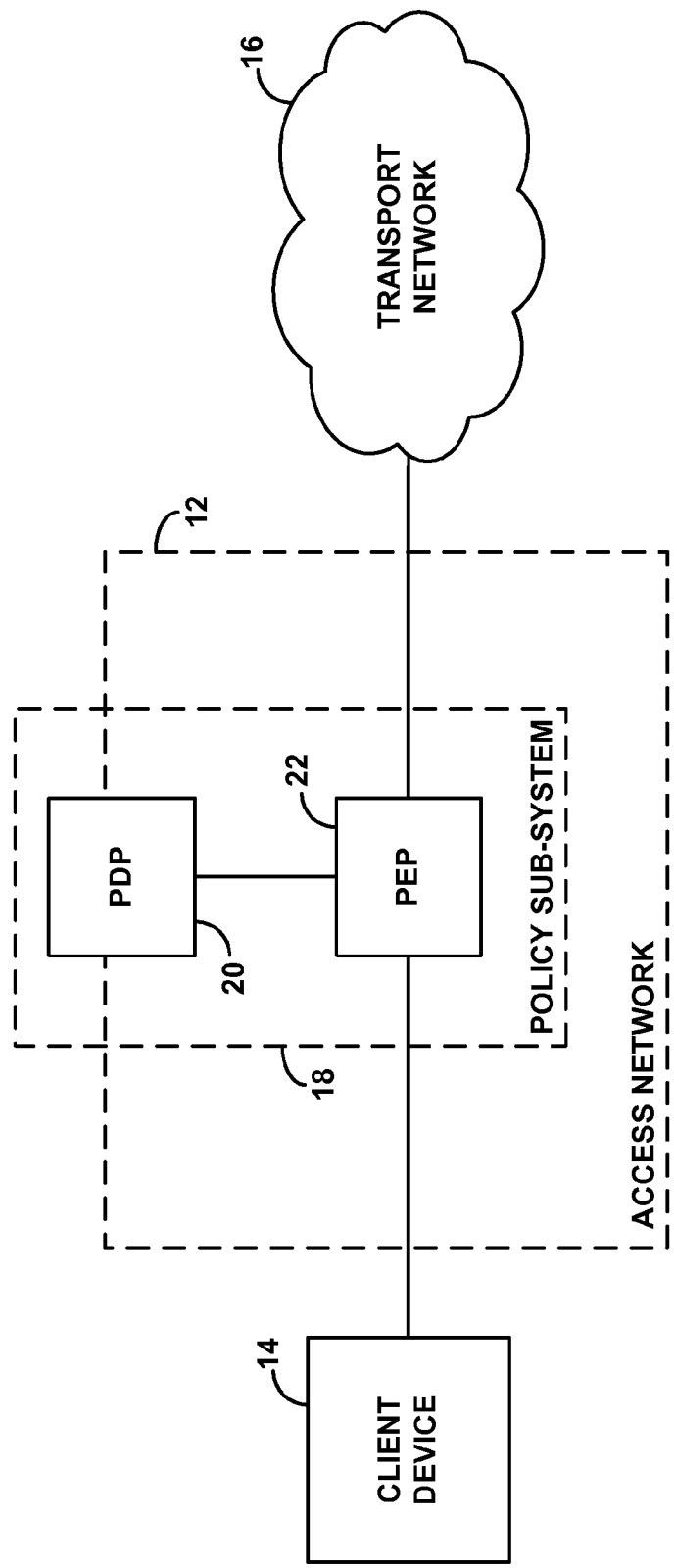
FIG. 1 is a simplified block diagram of an example network arrangement in which the present method can be implemented.

Referring to the drawings, as noted above, FIG. 1 is a simplified block diagram of an example network arrangement in which the present method can be implemented. As shown, the arrangement includes an access network 12 that functions to provide client devices with connectivity to one or more transport networks. In particular, the access network 12 is shown providing a representative client device 14 with connectivity to a representative transport network 16. To facilitate providing this connectivity, the access network may include one or more components that communicate with the client device 14 and with the transport network 16 and that bridge those communications together to allow the client device to engage in communications with entities on the transport network.

Access network 12 may be structured to provide various types of connectivity, such as landline, wireless, circuit-switched, and/or packet-switched, for various type of communications, such as voice and/or data for instance, and client device 14 and transport network 16 may be similarly configured. For instance, access network 12 may be a landline telephone network that provides circuit-switched connectivity for PSTN communications, in which case client device 14 may be a traditional landline telephone that engages in landline communication with the access network, and transport network 16 may be the PSTN. Alternatively, access network may be a radio access network that provides connectivity with the PSTN and/or the Internet, in which case client device 14 may be a wireless communication device that engages in wireless communication with the access network, and transport network 16 may be the PSTN or the Internet.

As a specific example, access network 12 may be cellular wireless network that includes one or more wireless base stations arranged to serve client devices in accordance with an air interface protocol such as Orthogonal Frequency Division Multiple Access (OFDMA (e.g., Long Term Evolution (LTE) or Wireless Interoperability for Microwave Access (WiMAX)), Code Division Multiple Access (CDMA), Global System for Mobile Communications (GSM), WIFI, or the like, and a switch or gateway that connects with a transport network such as the PSTN or the Internet. Representative client device 14 may then be a wireless communication device such as a cell phone, wirelessly-equipped computer, embedded wireless module, or the like, configured to be served wirelessly by such a base station and to engage in voice and/or data communication via the base station and the switch or gateway with entities on the PSTN or Internet. Other examples are possible as well.

In line with the discussion above, access network 12 may be arranged to serve client device 14 with telecommunication service (e.g., connectivity to communicate on transport network 16) in accordance with a particular set of service policy rules. As noted above, these service policy rules may define a quality of service to be provided to the client device, as well as other restrictions, allowances, and rules regarding configuration and operation of the access network when serving the client device. In practice, these service policy rules may be specific to the client device, pursuant to a service level agreement for instance, or may be generally applicable to various client devices served by the access network.

To facilitate this, access network 12 may be programmed with, have access to, or otherwise maintain a record of the service policy rules for client device 14 and may apply those service policy rules as the access network serves the client device. In particular, the access network may "apply" the service policy rules by being configured to enforce the service policy rules. For instance, if one of the service policy rules is to limit the client device's data rate to a particular level, the access network may apply that service policy rule by putting that data rate cap in place for the client device, so that if and when communication from the client device would exceed the cap, the access network may limit the rate to the cap. Likewise, if one of the service policy rules is to block communication by the client device to a particular network address, the access network may apply that service policy rule by putting that access control rule in place for the client device, so that if and when the client device attempts to communicate to that address, the access network may block the communication.

As shown in FIG. 1, the access network may include a policy-subsystem 18 that is arranged to maintain and apply the service policy rules for the client device. In particular, as shown, policy-subsystem 18 may include a policy decision point (PDP) 20 and a policy enforcement point (PEP) 22.

The PDP 20 may generally maintain a record of the service policy rules for the client device, as a service profile record for instance, which may indicate the various service policy rules and applicable triggers and parameters of each rule, such as indications of when the rules should apply and what the rules involve. For example, the service profile may specify various communication services or applications that the client device is entitled to use, such as whether the client device is entitled to engage in PSTN voice call communication and/or Internet data communication. As another example, the service profile may list various access control rules for the client device, such as particular network addresses that the client device is not entitled to contact. And as another example, the service profile may specify particular time of day restrictions on these or other rules.

The PEP 22 may then function to apply these rules as the access network serves the client device. For instance, when the access network begins serving the client device (such as when the client device first attaches to or registers with the access network and/or enters into an active or connected mode of communication with the access network), the PDP 20 may provide the PEP 22 with a copy of the client device's service profile or other indication of one or more service policy rules defined by the client device's profile. As the access network then serves the client device, the PEP 22 may then apply the client device's service policy rules. Alternatively, the PDP 20 may function to provide real-time service directives to the PEP 22 as the access network serves the client device. For instance, as the client device attempts to engage in particular communications, the PEP may signal to the PDP for guidance, the PDP may responsively consult the client device's service profile to decide which if any service policy rule applies, and the PDP may provide the PEP with a service directive to enforce the service policy rule.

In practice, the PEP may be a function of an access network component such as a switch or gateway that sits within the communication path between the client device and the transport network, so that the PEP can apply the service policy rules with respect to communications passing between the client device and the transport network. Alternatively, the PEP may be a function of an access network controller such as a mobility management entity or third party call control server that in some other manner governs operation of the access network and impacts how communications pass between the client device and the transport network. The PDP may then be co-located with the PEP or may be a function of another network component such as a home location register (HLR), a service control point (SCP), a home subscriber server (HSS), an authentication, authorization, and accounting server (AAA server), a policy charging and rules function (PCRF), or the like.

As the access network serves the client device with telecommunication service, communications to and from the client device may thus be subject to the service policy rules maintained and applied by the access network. For instance, communications from the client device may be limited to or allowed to have certain data rates or other communication quality levels, and communications from the client device to particular communication addresses or being of particular types may be blocked or allowed (e.g., for parent control or other purposes). To the extent the client device is user operated, the user of the client device may thus come to expect that the client device's communications will to be subject to those service policy rules.

At issue is then how to help maintain continuity of that service level when the client device stops being served by the access network and transitions to be served by another network instead. For instance, if the access network is a public land mobile network (PLMN) to which the client device subscribes for service (i.e., a home PLMN) and the client device stops being served by that network and transitions to be served instead by another provider's PLMN or by a WiFi-based network, at issue is how to help the client device experience a similar service level upon transitioning to that other provider's PLMN or to the WiFi network. As noted above, the present method helps to achieve this.

Figure 2:
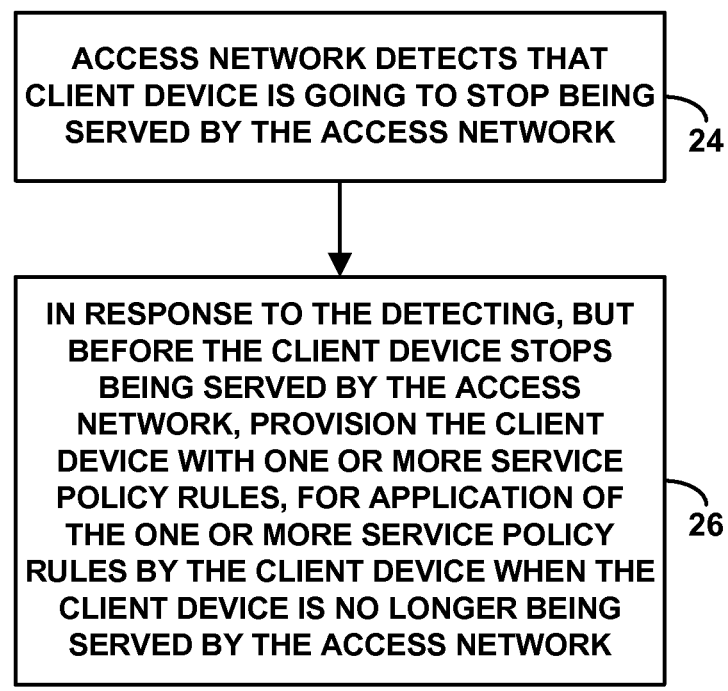
FIG. 2 is a flow chart depicting functions that can be carried out in accordance with the method.

FIG. 2 is a flow chart illustrating functions of the present method, which may be carried out while an access network is serving a client device. In accordance with the method, as shown at block 24, the access network will detect that the client device is going to stop being served by the access network. At block 26, in response to the access network detecting that that the client device is going to stop being served by the access network, but before the client device stops being served by the access network, the access network or another entity will then provision the client device with one or more service policy rules, for application of the one or more service policy rules by the client device when the client device is no longer being served by the access network.

In this method, the act of detecting that the client device is going to stop being served by the access network may take various forms and may be performed by various components of the access network, such as by a base station, switch, gateway, or controller for instance. For example, the act may involve a base station or controller of the access network receiving from the client device a request to de-register, detach, or hand-off from the access network (e.g., in response to the client device powering down, detecting threshold poor connectivity with the access network, and/or detecting threshold better connectivity from another network), which would indicate that the client device is leaving service of the access network. As another example, the act may involve the access network detecting an issue with operation of the access network and/or with serving of the client device (such as threshold load at a base station or other network component currently serving the client device), and the access network concluding based on that issue and/or one or more other factors that the client device should stop being served by the access network. In that case, the access network may then initiate a process of de-registering, detaching, or handing out of the client device from the access network.

In turn, to provision the client device with one or more service policy rules in accordance with the method, an entity of the access network, such as the PDP or PEP described above for instance, may then generate and transmit to the client device one or more provisioning messages that provide the client device with specifications of the one or more service policy rules in a manner that the client device is programmed to receive, store, and apply. For example, the entity may programmatically package the one or more service policy rules and send the package to a standard provisioning server that is arranged to provision the client device with service logic, and that provisioning server may then transmit the one or more service policy rules to the client device for storage and application by the client device in the same way that the server otherwise provisions the client device with service logic. In practice, the act of transmitting one or more service policy rules to the client device may involve storing the one or more service policy rules at a network address and transmitting to the client device a trigger message, such as a coded Short Message Service (SMS) message (e.g., WAP Push message) that causes the client device to request and retrieve the one or more service policy rules from that network address.

As noted above, this process can be refined further by having the access network or other entity select from the client device's service policy rules one or more particular service policy rules that are not specific to operation of the access network but are rather more broadly applicable and may thus be applicable when the client device is being served by another network instead.

In particular, the service policy rules that the access network maintains and applies for the client device may include one or more rules that are specific to the access network and one or more rules that are not specific to the access network, and the client device's service profile record may specify (e.g., with a Boolean flag or the like) which service policy rules are access network specific (context invariant) and which are not. Examples of service policy rules that are specific to the access network may include rules specifying limits on how many internal connections (e.g., bearer links) within the access network can be reserved at any time for the client device, what components of the access network can be used to serve the client device, and other parameters related to configuration and operation of the access network itself. Examples of policy rules that are not specific to the access network, on the other hand, may include rules related to allowed bit rates or coding levels for communications, restrictions on communication addresses that the client device is allowed to contact, and other such parameters that could be applied in other network contexts as well.

Once the access network detects that the client device is going to stop being served by the access network, the access network or another entity (e.g., at the initiation of the access network) may select from the set of service policy rules that the access network maintains and applies for the client device a subset (e.g., proper subset) of the service policy rules, such as just the one or more service policy rules that are not specific to the access network. Further, the access network or other entity may also consider other factors when deciding which subset of the service policy rules to provision the client device with. For instance, the selection may be based on time of day, capabilities and services of a target access network to which the client device is going to transition to be served, and/or other factors. The access network or other entity may then provision the client device with the selected subset of the service policy rules.

Advantageously through this process, the client device would thus become provisioned to apply the subset of the service policy rules itself while the client device is no longer being served by the access network, such as when the client device is being served by another network instead. Consequently, as the client device then engages in telecommunication service while not being served by the access network that was serving the client device, the client device may experience a service level similar to that which it experienced while being served by the access network.

For example, if the subset of the service policy rules includes a bit rate limitation for specified communication services or applications, the client device itself may then function as PEP to enforce that limitation by capping the rate of its own data output for the specified communication services or applications. As another example, if the subset of the service policy rules includes an access control rule that blocks outbound communication to a particular network address, the client device itself may block outbound communications to that address. And as another example, if the subset of the service policy rules includes a rule that limits or allows use of particular communication applications or services, the client device itself may similarly enforce that limit or allowance. Other examples are possible as well.

As also discussed above, still further continuity of service level could be provided for a client device by taking into account the client device's service policy rules if and when the client device then returns to being served by access network. In particular, when the client device returns or is returning to being served by the access network, the client device may report to the access network at least one of the service policy rules that the access network or other entity had provisioned the client device with, and the access network may then serve the client device based at least in part on that received service policy rule. This may help in a scenario where the client device's service profile has changed since the client device was last served by the access network.

By way of example, if the access network had provisioned the client device with a bit rate limitation or access control rule, then when the client device re-registers with, attaches with, or hands off back to, the access network, the client device may transmit to the access network a specification of that service policy rule. The access network may then compare that received service policy rule with a corresponding service policy rule that the access network currently maintains for the client device and, based on that comparison, may opt to apply either the received service policy rule or the currently maintained service policy rule. For instance, if the access network determines that the currently maintained service policy rule is a newer version than the received service policy rule, the access network may responsively select the received rule to help maintain service level continuity for the client device. On the other hand, if the access network determines that one of the rules being compared is more permissive than the other (e.g., allowing for a higher maximum data rate, or allowing greater access), the access network may responsively select the more permissive version of the rule to apply. Variations on this process are possible as well.

Figure 3:
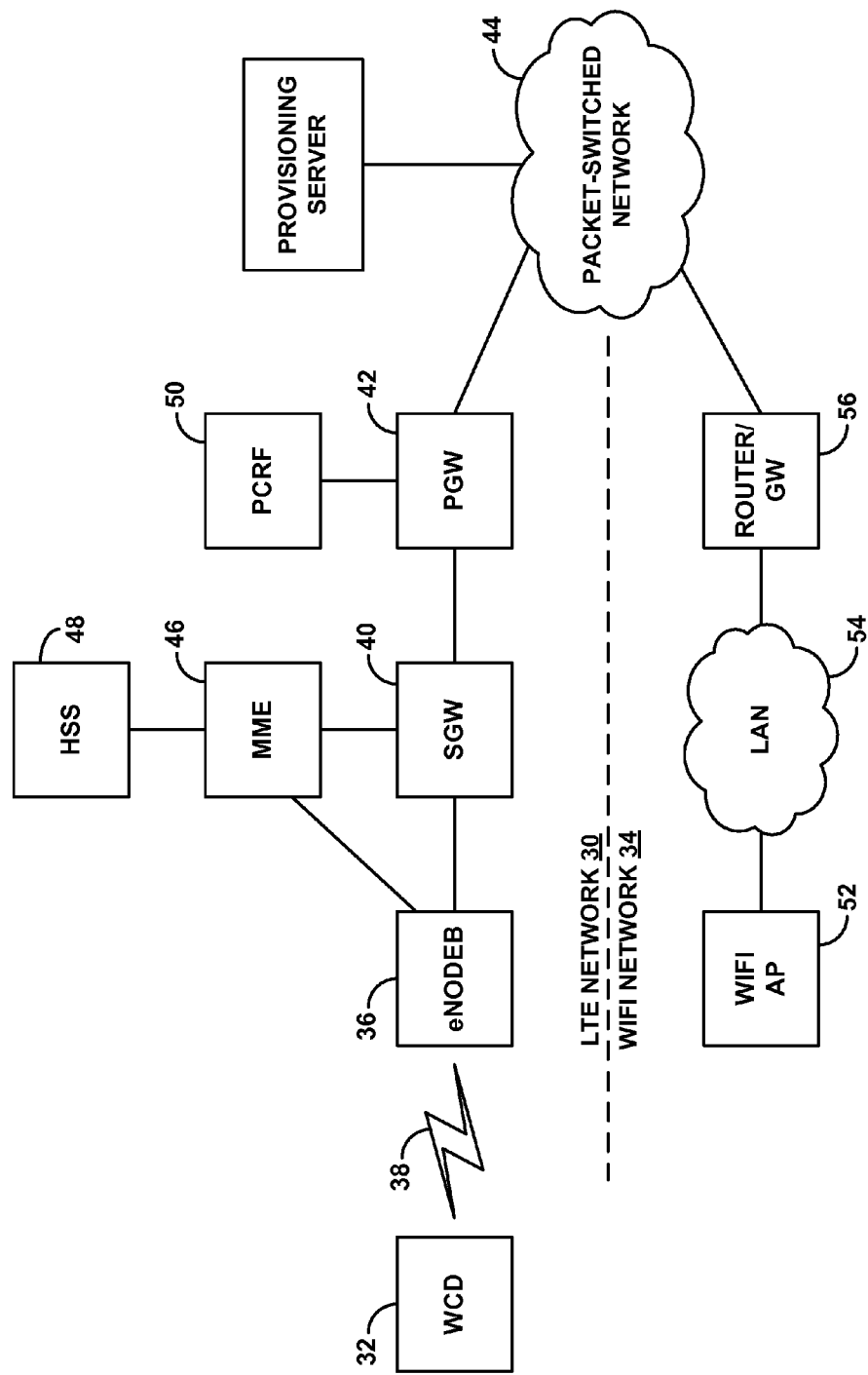
FIG. 3 is a simplified block diagram of another example network arrangement in which the method can be implemented.

FIG. 3 is next a more specific but still simplified depiction of a network arrangement in which the present method can be implemented. In particular, the figure depicts the access network as an LTE access network 30 and the client device as a wireless communication device (WCD) 32 served by the LTE network. Further, the figure depicts an example other network as a WiFi-based network 34 to which the wireless communication device could transition to be served. It should be understood that these two types of access networks are just examples, and that the principles described can extend to apply with respect to any other types of access networks, such as wireless access networks operating in accordance with other air interface protocols for instance.

As shown in FIG. 3, the example LTE access network 30 includes components traditionally found in an LTE network. For instance, the LTE network includes an eNodeB 36 that serves the WCD over an LTE air interface 38. The eNodeB then has an interface with a Serving Gateway (SGW) 40, which has an interface in turn with a Packet Gateway (PGW) 42 that provides connectivity with a packet-switched network 44 such as the Internet. Further, each eNodeB has an interface with a Mobility Management Entity (MME) 46, which functions as a signaling controller and to manage set up of bearer tunnels for transmission of data between the eNodeB and the PGW, to carry data traffic between the WCD and the packet-switched network.

In addition, the MME has an interface with an HSS 48, and the HSS may function as a PDP and the MME may function as a PEP. For instance, the HSS may maintain a service profile record defining one or more service policy rules for the WCD and may provide the MME with that service profile data when the WCD attaches to or is served by the LTE network. The MME may then store that service profile data in a context record for the WCD and apply the service policy rules as the LTE network serves the WCD.

Likewise, the PGW has an interface with a PCRF 50, and the PCRF may function as a PDP and the PGW may function as a PEP. For instance, the PCRF may maintain a service profile record defining one or more service policy rules for the WCD and may provide the PGW with that service profile data when the WCD attaches to or is served by the LTE network. The PGW may then store that service profile data in a context record for the WCD and may apply the service policy rules as the LTE network serves the WCD.

In practice with this arrangement, when the WCD enters into coverage of the eNodeB, the WCD may detect a sufficiently strong reference signal from that eNodeB and may transmit to the eNodeB an attach request, seeking to connect with the eNodeB. Upon receipt of the attach request, the eNodeB may then pass the request to the MME. In response, the MME may then engage in signaling with the HSS to authenticate and obtain service profile data for the WCD, so that the MME can apply service policy rules for the WCD. Further, the MME may signal with the SGW, which may in turn signal with the PGW to facilitate setup of one or more bearers defining virtual tunnels for carrying data traffic through the LTE network between the WCD and the PGW. In this process, the PGW may then engage in signaling with the PCRF to obtain service profile data for the WCD, so that the PGW may apply service policy rules for the WCD. In addition, while the LTE network is serving the WCD, the network may establish still additional bearers for the WCD to the extent permitted by and in accordance with the WCD's service profile.

With one or more bearers set up for the WCD, data communication may then flow between the WCD and the PGW and thus between the WCD and entities on the packet-switched network 44.

The example WiFi-based network 34 shown in FIG. 3 then comprises a representative WiFi access point 52 sitting on a local area network (LAN) 54 that is coupled by a router, gateway, and/or other network element 56 with the packet-switched network 44. With this arrangement, when the WCD is within coverage of the WiFi access point 52, the WCD may conventionally associate with the access point and then engage in packet-switched communication via the WiFi-based network with entities on the packet-switched network.

The present method can apply in the arrangement of FIG. 3 in various ways. By way of example, if and when the WCD sends a detach request message to the eNodeB to request discontinuation of the LTE network serving the WCD, the LTE network may respond by provisioning the WCD with one or more service policy rules before or as part of granting the detach request. For instance, when the MME receives the WCD's detach request, the MME may signal to the HSS and/or to the SGW, which may signal to the PGW, which may in turn signal to the PCRF. In response to learning that the WCD is going to detach, the MME, HSS, PGW, and/or PCRF may then transmit to the WCD one or more service policy rules for the WCD to apply when the WCD is no longer being served by the LTE network. In practice, for instance, the MME, HSS, PGW, and/or PCRF could package one or more such service policy rules and send the package to a provisioning server 58 sitting on the packet-switched network 44, which may in turn provision the WCD with the one or more service policy rules.

As another example, if the eNodeB or other component of the LTE network becomes threshold loaded (e.g., is serving more than a predefined threshold number of WCDs at the time, or is likely to do so), an entity such as the MME, HSS, PGW, and/or PCRF could responsively provision the WCD with one or more service policy rules and could then trigger a network-initiated detach process to detach the WCD from the LTE network. For instance, the eNodeB may be arranged to regularly report its load to the MME and/or via the SGW and PGW to the PCRF. The MME and/or PCRF may then be arranged to detect when the eNodeB's load exceeds a threshold and to responsively transmit to the WCD one or more service policy rules for the WCD to apply. Further, the MME and/or PCRF may signal with other entities of the LTE network to then detach the WCD from the LTE network, which may include transmitting a detach directive or engage in other such signaling with the WCD.

Likewise, the LTE network may detect that the WCD is losing coverage of the LTE network, as indicated by progressively lower signal strength reports from the WCD, and an entity of the LTE network may responsively provision the WCD with one or more service profile rules before the WCD fully loses coverage and thus stops being served by the LTE network.

As still another example, if the WCD is engaging in a process to hand off from being served by the LTE network to being served by the WiFi-based network, the WCD and/or WiFi-based network may signal to the LTE network to indicate this likely transition. Though this process or otherwise, the LTE network may thus detect that the WCD is going to hand off from being served by the LTE network to being served by the WiFi network. In response, an entity of the LTE network such as the MME, HSS, PGW, and/or PCRF may then provision the WCD with one or more service policy rules before allowing the handoff to occur, i.e., before the WCD transitions from being served by the LTE network to being served by the WiFi-based network.

In line with the discussion above, some of the service policy rules that the LTE network has in place for the WCD may be specific to the LTE network, and others may be more generally applicable. For instance, service policy rules specific to the LTE network may include rules regarding how many LTE bearers can be set up at a time for the WCD, rules regarding which particular LTE network elements or LTE network functions can apply for the WCD, and so forth. Whereas, service policy rules not specific to the LTE network may include data rate limitations, access control rules, content filtering rules, and so forth as discussed above. In practice, the entity that provisions the WCD with one or more service policy rules in this context may select just the one or more service policy rules that are not specific to the LTE network and may provision the WCD with the selected one or more service policy rules.

In addition, one or more of the service policy rules that the entity provisions the WCD with could be specific to a target network to which the WCD is going to hand off. For instance, the LTE network may have data that correlates eNodeBs with WiFi access points in the vicinity and, when the LTE network detects that the WCD is going to stop being served by the LTE network, the LTE network may provision the WCD with one or more service policy rules specific to an WiFi access point nearby the WCD's currently serving eNodeB.

Further, also in line with the discussion above, the LTE network may be arranged to provide additional service level continuity for the WCD if and when the WCD returns to be served by the LTE network, by then considering the WCD's service policy rules. For instance, if and when the WCD newly sends an attach request message to the LTE network or sends another message seeking to be served by the LTE network, the WCD may include with that message or in another message to the LTE network a specification of at least one service policy rule that the LTE network or other entity had provisioned the WCD with. Such information may then propagate in signaling through the LTE network, to entities such as the MME, HSS, PGW, and PCRF. And the LTE network entity may then consider that information as a basis to decide how to serve the WCD.

For instance, the entity may compare the received service policy rule with a service policy rule that the LTE network currently has in place for the WCD and may select the received service policy rule or the current service policy rule based on the comparison, such as by selecting the newer version of the two, or by selecting the more permissive of the two for example. The entity may then take necessary steps (such as storing the selected service policy rule and/or signaling with one or more other entities of the LTE network) to cause the LTE network to apply the selected service policy rule when serving the WCD.

Figure 4:
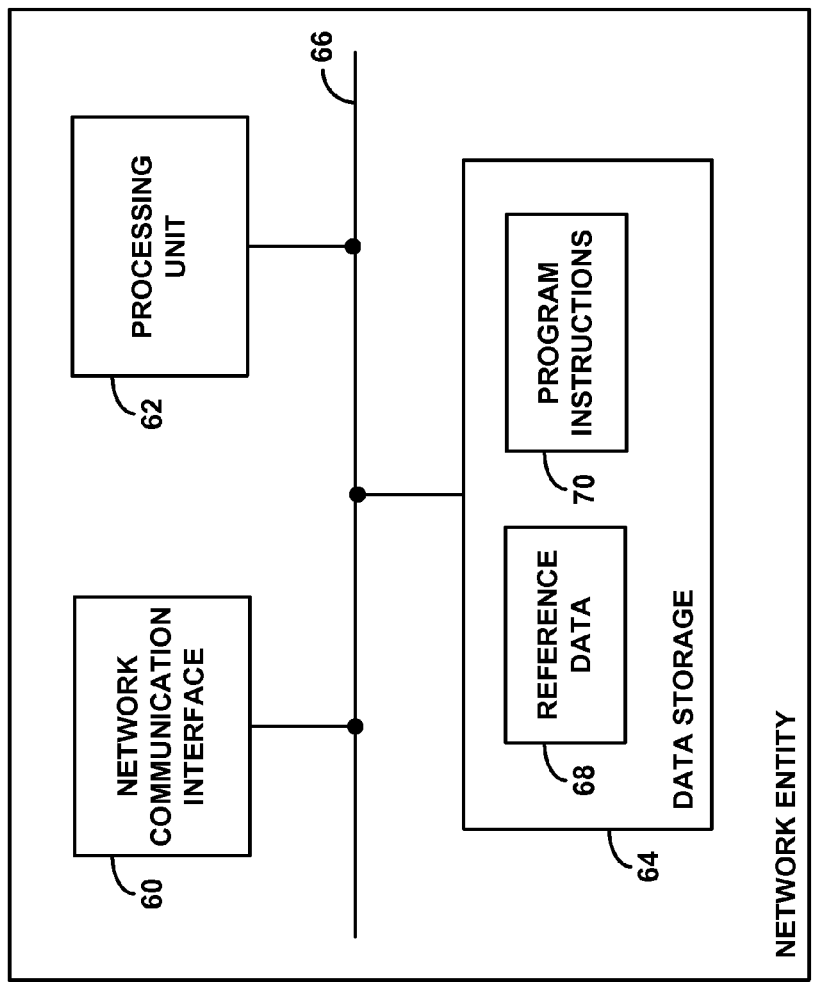
FIG. 4 is a simplified block diagram depicting components of one or more network entities that may carry out aspects of the method.

FIG. 4 is next a simplified block diagram depicting components of one or more example access network entities that may be arranged to carry out various aspects of the present method. As shown in FIG. 4, the components include a network communication interface 60, a processing unit 62, and data storage 64, all of which may be communicatively linked together by a system bus, network, or other connection mechanism 66.

In this example arrangement, network communication interface 60 functions to facilitate communication with various other entities of the system. As such, the interface may include a wired or wireless Ethernet module or other interface, depending on the manner in which communication will occur. Processing unit 62 may then comprise one or more general purpose processors (e.g., microprocessors) and/or one or more special purpose processors (e.g., application specific integrated circuits or digital signal processors). And data storage 64 may comprise one or more volatile and/or non-volatile storage components (non-transitory), such as magnetic, optical, flash, or organic storage components.

As shown, data storage 64 may contain reference data 68 and program instructions 70. Reference data 68 may comprise service profile data for each of various client devices and may thus define for each client device a set of service policy rules that the access network would apply when serving the client device with telecommunication service. Program instructions 70, in turn, may then comprise machine language instructions or the like that are executable by the processing unit 62 to carry out various functions described herein, such as to detect when the client device is going to stop being served by the access network and to responsively provision the client device with one or more service policy rules for application by the client device while the client device is no longer being served by the access network.

Figure 5:
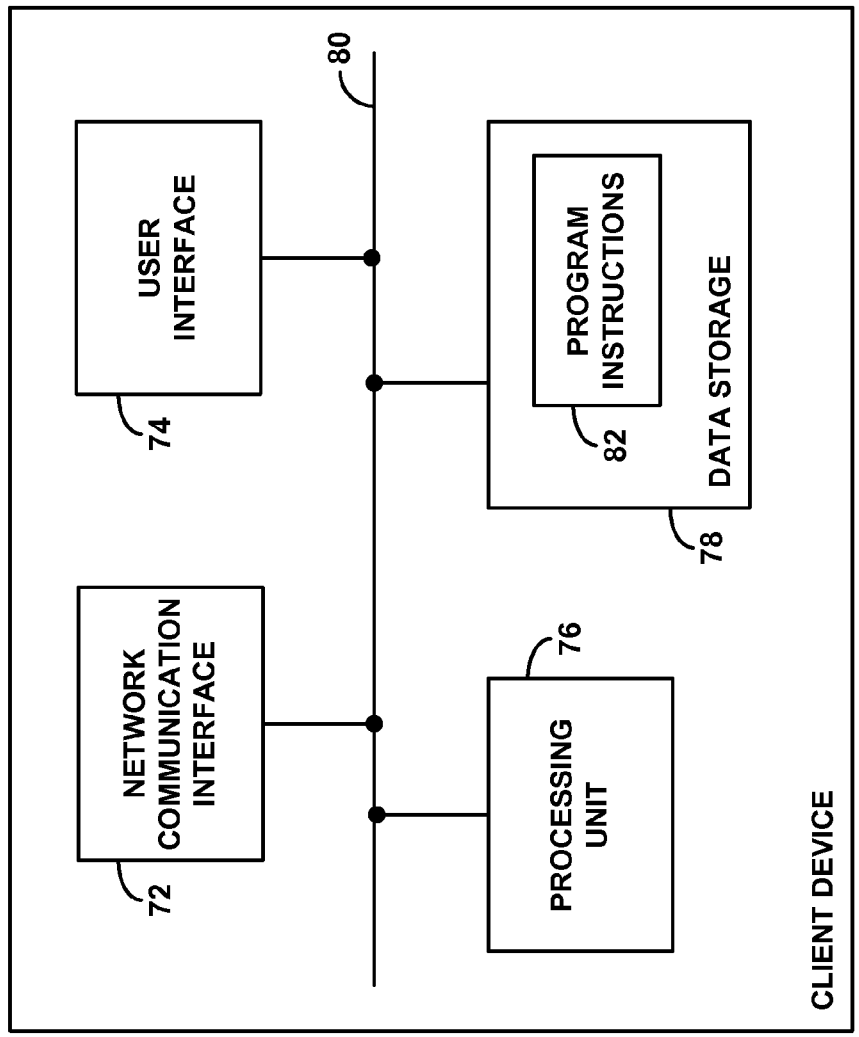
FIG. 5 is a simplified block diagram depicting components of a client device that may benefit from operation of the method.

FIG. 5 is then a simplified block diagram depicting components of an example client device that may be arranged to benefit from operation of the present method. As shown, the example client device includes a network communication interface 72, a user interface 74, a processing unit 76, and data storage 78, all of which may be communicatively linked together by a system bus, network, or other connection mechanism 80.

In this example arrangement, network communication interface 72 functions to facilitate communication with one or more access networks, such as those discussed above for instance, and may thus take various forms to facilitate various types of communication such as wireless, landline, circuit-switched, and/or packet-switched communication. For example, the network communication interface may comprise a wireless communication chipset and antenna structure configured to communicate with one or more radio access networks such as the LTE and WiFi networks shown in FIG. 3.

User interface 74 may then comprise one or more user interface components to facilitate interaction with a user of the client device if appropriate (if the client device is user-operated), including input components such a keypad, touch-sensitive surface, microphone, and camera, and output components such as a display screen and sound speaker. Further, processing unit 76 may comprise one or more general purpose processors (e.g., microprocessors) and/or one or more special purpose processors (e.g., application specific integrated circuits or digital signal processors). And data storage 78 may comprise one or more volatile and/or non-volatile storage components (non-transitory), such as magnetic, optical, flash, or organic storage components. As shown, data storage 78 may contain program instructions 82, which may comprise machine language instructions executable by processing unit 76 to carry out various client device functions described herein.

Figure 6:
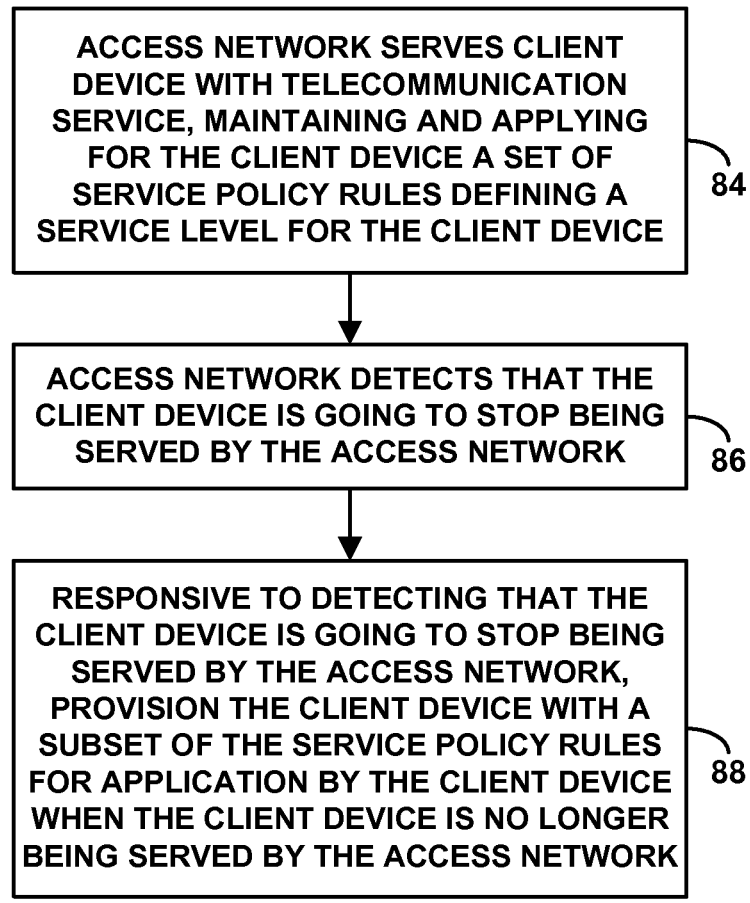
FIG. 6 is another flow chart depicting functions that can be carried out in accordance with the method.

Finally, FIG. 6 is another flow chart depicting functions that can be carried out in accordance with the present method. These functions may be carried out by one or more components of an access network, such as the LTE network discussed above for instance, to facilitate service level continuity for a client device.

As shown in FIG. 6, at block 84, the method involves the access network serving the client device with telecommunication service, wherein the access network maintains and applies for the client device a set of service policy rules defining a service level for the client device. The act of serving of the client device may involve establishing service for the client device, such as setting up one or more bearers and connectivity for the client device, actively carrying communications between the client device and a transport network, and/or other such functions.

At block 86, the method then involves the access network detecting that the client device is going to stop being served by the access network. In line with the discussion above, for instance, this may involve an entity of the access network detecting that the client device is going to de-register, detach, and/or hand-off from the access network, whether client initiated or network initiated.

And at block 88, the method then involves, responsive to detecting that the client device is going to stop being served by the access network, provisioning the client device with a subset of the service policy rules for application by the client device when the client device is no longer being served by the access network. As discussed above, this provisioning function may be carried out by an entity of the access network and/or by another entity and may involve transmitting a specification of the subset of the service policy rules, for storage of the subset of the service policy rules at the client device and application of the subset of the service policy rules by the client device.

Further in line with the discussion above, the set of service policy rules may include (i) one or more service policy rules specific to the access network and (ii) one or more service policy rules not specific to the access network, and the subset of the service policy rules may be the one or more service policy rules not specific to the access network. In that case, the method may then further involve the access network or other entity selecting the subset of the service policy rules from the set of service policy rules.

Moreover, also in line with the discussion above, the method may additionally involve, after the client device stops being served by the access network, (i) the access network detecting resumption of the client device being served by the access network, such as detecting that the client device is newly registering with, attaching to, or handing off to the access network, and (ii) the access network receiving from the client device at least one service policy rule of the subset of the service policy rules with which the client device was provisioned. And the method may involve the access network then serving the client device with telecommunication service based on the received service policy rule, such as by comparing the received service policy rule with a service policy rule currently maintained for the client device and selecting and applying either of those service policy rules for instance.

Exemplary embodiments have been described above. Those skilled in the art will appreciate, however, that many variations from the embodiments are possible while remaining within the spirit and scope of the claims.

We claim:

1. A method to facilitate service level continuity for a client device, the method comprising:
   serving the client device with telecommunication service, by an access network, wherein the access network maintains and applies for the client device a set of service policy rules defining a service level for the client device;
   detecting by the access network that the client device is going to stop being served by the access network; and
   responsive to the detecting but before the client device stops being served by the access network, provisioning the client device with a subset of the service policy rules for application by the client device when the client device is no longer being served by the access network,
   wherein provisioning the client device with the subset of the service policy rules comprises transmitting by the access network to the client device the subset of the service policy rules, for storage of the subset of the service policy rules at the client device and application of the subset of the service policy rules by the client device.

2. The method of claim 1, wherein the client device comprises a wireless communication device, and wherein transmitting the subset of the service policy rules to the client device comprises transmitting to the client device a trigger that causes the client device to download the subset of service policy rules from a network server.

3. The method of claim 1, wherein the set of service policy rules includes (i) one or more service policy rules specific to the access network and (ii) one or more service policy rules not specific to the access network, and wherein the subset of the service policy rules is the one or more service policy rules not specific to the access network.

4. The method of claim 3, further comprising selecting the subset of the service policy rules from the set of service policy rules.

5. The method of claim 1, wherein the access network comprises a base station wirelessly serving the client device, and wherein detecting that the client device is going to stop being served by the access network comprises detecting that the base station is threshold loaded, the method further comprising:
   after provisioning the client device with the subset of the service policy rules, signaling to the client device to cause the client device to stop being served by the access network.

6. The method of claim 1, wherein detecting that the client device is going to stop being served by the access network comprises receiving a deregistration message indicating that the client device is leaving service of the access network.

7. The method of claim 1, wherein detecting that the client device is going to stop being served by the access network comprises detecting by the network that the client device is going to hand off from being served by the access network to being served by a target network.

8. The method of claim 1, further comprising:
   after provisioning the client device with the subset of the service policy rules, signaling to the client device to cause the client device to stop being served by the access network.

9. The method of claim 1, further comprising:
   after the client device stops being served by the access network, (i) detecting by the access network resumption of the client device being served by the access network and (ii) receiving by the access network from the client device at least one service policy rule of the subset of the service policy rules with which the client device was provisioned; and
   then serving the client device with telecommunication service, by the access network, based on the received service policy rule.

10. The method of claim 9, wherein serving the client device with telecommunication service based on the received service policy rule comprises:
   comparing the received service policy rule with a service policy rule currently maintained by the access network for the client device; and
   based on the comparing, selecting by the access network either the at least one service policy rule or the currently maintained service policy rule; and
   applying the selected service policy rule for the client device.

11. The method of claim 10, wherein the comparing comprises determining whether the currently maintained service policy rule is a newer version than the received service policy rule, and wherein selecting based on the comparing comprises selecting based on whether the currently maintained service policy rule is a newer version that the received service policy rule.

12. The method of claim 10, wherein the comparing comprises determining whether the currently maintained service policy rule is more permissive than the received service policy rule, and wherein selecting based on the comparing comprises selecting based on whether the currently maintained service policy rule is more permissive than the received service policy rule.

13. An access network comprising:
one or more wireless base stations;
a gateway being configured to serve a wireless client device with telecommunication service in accordance with a set of service policy rules for the wireless client device, wherein the set of service policy rules define a service level for the wireless client device;
a processing unit;
data storage; and
program instructions stored in the data storage and executable by the processing unit to carry out functions comprising:
  detecting, when the client device is being served by the access network, that the client device is going to stop being served by the access network, and
  responsive to detecting that the client device is going to stop being served by the access network but before the client device stops being served by the access network, provisioning the client device with a subset of the service policy rules, for application by the client device when the client device is no longer being served by the access network,
  wherein provisioning the wireless client device with the subset of the service policy rules comprises transmitting the subset of the service policy rules to the wireless client device for storage at and application by the wireless client device.

14. The access network of claim 13, wherein the access network is a Long Term Evolution (LTE) access network, wherein the wireless client device is an LTE-capable client device, wherein the gateway comprises a packet gateway (PGW) that provides the wireless client device with connectivity to a packet-switched network when the wireless client device is served by at least one of the one or more base stations, wherein the processing unit and data storage are elements of a policy charging and rules function (PCRF), and wherein the PCRF supplies the PGW with the set of service policy rules defining the service level for the wireless client device.

15. The access network of claim 14,
wherein the set of service policy rules includes (i) one or more service policy rules specific to the LTE access network and (ii) one or more service policy rules not specific to the LTE access network, and
wherein the program instructions are further executable by the processing unit to select as the subset of the service policy rules with which to provision the wireless client device the one or more service policy rules not specific to the LTE access network.

16. The access network of claim 14, whether the functions further comprise:
  detecting, after the wireless client device stops being served by the access network, that the wireless client device is resuming being served by the access network,
  receiving from the wireless client device resuming being served by the access network at least one service policy rule of the subset of the service policy rules with which the access network had provisioned the client device,
  comparing the received service policy rule with a service policy rule currently maintained by the access network for the wireless client device,
  based on the comparing, selecting either the received service policy rule or the currently maintained service policy rule, and
  causing the access network to serve the wireless client device in accordance with the selected service policy rule rather than in accordance with the other of the received service policy rule and currently maintained service policy rule.

17. The access network of claim 14, wherein the functions further comprise:
  after provisioning the wireless client device with the subset of the service policy rules, signaling to the wireless client device to cause the wireless client device to stop being served by the access network.

* * * * *